United States Patent [19]

Collins

[11] Patent Number: 4,587,556
[45] Date of Patent: May 6, 1986

[54] TELEVISION STANDARDS CONVERTERS

[75] Inventor: Mark C. Collins, Basingstoke, United Kingdom

[73] Assignee: Sony Corporation, Tokyo, Japan

[21] Appl. No.: 607,764

[22] Filed: May 7, 1984

[30] Foreign Application Priority Data

May 17, 1983 [GB] United Kingdom ............... 8313512

[51] Int. Cl.$^4$ .............................................. H04N 7/01
[52] U.S. Cl. ...................... 358/140; 358/11
[58] Field of Search .................. 358/140, 11

[56] References Cited

U.S. PATENT DOCUMENTS

| 4,276,565 | 6/1981 | Dalton et al. | 358/140 |
| 4,332,750 | 3/1982 | Lord et al. | 358/140 |

Primary Examiner—James J. Groody
Assistant Examiner—Victor R. Kostak
Attorney, Agent, or Firm—Lewis H. Eslinger; Alvin Sinderbrand

[57] ABSTRACT

A television standards converter comprises three field stores and four 4-line stores for receiving an input digital television signal of one standard and deriving therefrom arrays of sixteen lines, each array consisting of four successive lines from each of four successive fields of the input television signal, a weighting coefficient store for storing sets of sixteen weighting coefficients, respective sets corresponding to positions both spatial and temporal of respective lines of an output digital television signal of a different standard, relative to the sixteen lines of the input television signal, two interpolation filters for deriving line-by-line the output television signal by multiplying corresponding sample values from each of the sixteen lines of the input television signal by a respective weighting coefficient in a set of weighting coefficients and summing the resulting products to form an interpolated sample value, and four output field stores for receiving and storing the derived lines of the output television signal and from which the output television signal is read.

6 Claims, 8 Drawing Figures

FIG. 6. 525/60→625/50

| WRITE | 525/60 | 27+28 | 28+29 | 29+26 | 26+27 | 27+28 | 28 | 29 | 29+26 | 26+27 | 27+28 | 28+29 | 29 | 26 | 26-27 |
|---|---|---|---|---|---|---|---|---|---|---|---|---|---|---|---|
| READ | 625/50 | 26 | 27 | 28 | 29 | 26 | 27 | 28 | 29 | 26 | 27 | 28 | 29 | | |

FIG. 7. 625/50→525/60

| WRITE | 625/50 | 26 | 27 | 28 | 29 | 26+27 | 28 | 29 | 26 | 27 | 28+29 | 26 | 27 | | |
|---|---|---|---|---|---|---|---|---|---|---|---|---|---|---|---|
| READ | 525/60 | 28 | 29 | 26 | 27 | 28 | 29 | 26 | 27 | 28 | 29 | 26 | 27 | 28 | 29 |

TELEVISION STANDARDS CONVERTERS

BACKGROUND OF THE INVENTION

1. Field of the Invention

This invention relates to television standards converters.

2. Description of the Prior Art

International television programme exchange necessitates standards converters due to the different television standards used in different countries, for example, the 625-line 50-field per second PAL system used in the UK, and the 525-line 60-field per second NTSC system used in the USA.

Many different standards converters have been previously proposed, but currently one of the best known is the ACE (Advanced Conversion Equipment) developed by the British Broadcasting Corporation. Basically ACE operates on an input digital television signal line-by-line to derive interpolated samples required to form an output digital television signal. Interpolation is done not only spatially using four successive horizontal scan lines of the input television signal, but also temporally using four successive fields of the input television signal. Thus, each line of the output television signal is derived by multiplying respective samples from sixteen lines of the input television signal by respective weighting coefficients.

Further details of ACE will be found in UK patent specification No. 2 059 712 A and in "Four-field digital standards converter for the eighties" by R N Robinson and G J Cooper at Pages 11 to 13 of "Television" (the journal of the Royal Television Society) for January/February 1982.

Although ACE gives good results, there is the problem that the equipment is very bulky. This is because the interpolation function is really only one half of the total operation required for standards conversion, the other half of the operation being the re-organisation of the samples in time to form the output television signal with the correct timing. It should be understood that this re-timing of the data is quite distinct from the temporal aspect of the interpolation. In ACE both these functions are combined in a single store of four fields capacity and hence there is a necessity to access sixteen samples simultaneously for the interpolation process. To avoid clashes of reading and writing in the same element of the store, the store is configured using 4k×1 dynamic random access memories (RAMs). For a sampling rate of 13.5 MHz, this means that 3500 such RAMs are required. Having regard also to the necessary control circuitry, this means that ACE is of considerable size and complexity, which not only makes it costly but also creates problems of maintenance and reliability.

One object of the present invention is to provide an improved television standards converter.

Another object of the present invention is to provide a television standards converter in which the input field stores are separated from the output field stores.

According to the present invention there is provided a television standards converter comprising:

an input store for receiving an input digital television signal of one standard and deriving therefrom arrays of sixteen lines, each array consisting of four successive lines from each of four successive fields of said input television signal;

a weighting coefficient store for storing sets of sixteen weighting coefficients, respective said sets corresponding to positions both spatial and temporal of respective lines of a output digital television signal relative to said sixteen lines of said input television signal;

two interpolation filters each for deriving line-by-line said output television signal by multiplying corresponding sample values from each of said sixteen lines of said input television signal by a respective weighting coefficient in a said set of weighting coefficients and summing the resulting products to form an interpolated sample value;

an output store for receiving and storing said derived lines of said output television signal and from which said output television signal is read; and a multi-line store connected between the output of one of said interpolation filters and said output store and used to store the additional lines derived when said output television signal has more lines per field than said input television signal.

The above, and other objects, features and advantages of this invention will be apparent from the following detailed description of illustrative embodiments which is to be read in connection with the accompanying drawings.

BRIEF DESCRIPTION OF THE DRAWINGS

FIG. 6 is a timing diagram for conversion from a television signal of one standard to a television signal of another standard; and FIG. 7 is a timing diagram for conversion in the opposite direction.

DESCRIPTION OF THE PREFERRED EMBODIMENTS

The basic interpolation process used in the embodiment of television standards converter to be described will first be explained with reference to FIG. 1.

Basically the interpolation process involves continuously re-scanning the input digital television signal line-by-line to produce a new digital television signal at the output standard. In fact, there are two distinct processes involved in this, although in the actual interpolation process these are done simultaneously. The first process is the generation of an output picture with the correct number of lines per field, and the second process is the generation of an output picture with the correct number of fields per second. The first process involves spatial (hereinafter referred to as vertical) interpolation, and the second process involves temporal interpolation. It should be noted that horizontal interpolation is not necessary, because the line lengths are similar.

Figure 1:
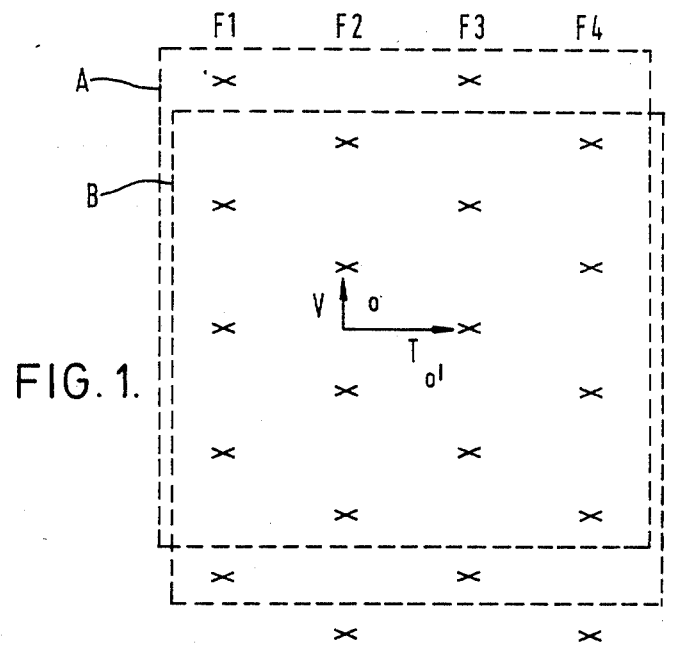
FIG. 1 illustrates diagrammatically an interpolation process.

FIG. 1 shows respective sequences of successive horizontal scan lines from four successive fields F1 to F4 of an input television signal. A desired output line is represented in vertical position and time by "o".

To generate the output line, weighted contributions from each of the array of sixteen input lines shown within a square A are summed. Firstly, the position of the output line is determined relative to the two nearest input lines by determining the vertical position of the output line to the nearest of, for example, sixteen quantised steps into which the vertical distance (V) between two horizontal scan lines in a frame, that is half the vertical distance between two horizontal scan lines in a field, is divided, and with reference to the nearest of, for example, sixteen quantised steps into which the time interval (T) between two successive fields is divided. Given the position of the output line in this way, each sample value for the output line is derived by multiplying the corresponding sample value of each of these sixteen input lines in the array by a previously computer-generated weighting coefficient and summing the resulting products to form an interpolated sample value. The set of sixteen weighting coefficients is sometimes referred to as an interpolation aperture function.

In the case of another output line "o'", the input lines used step down by half the vertical interval between horizontal scan lines, so the array of sixteen input lines used are then those within a square B.

Figure 2:
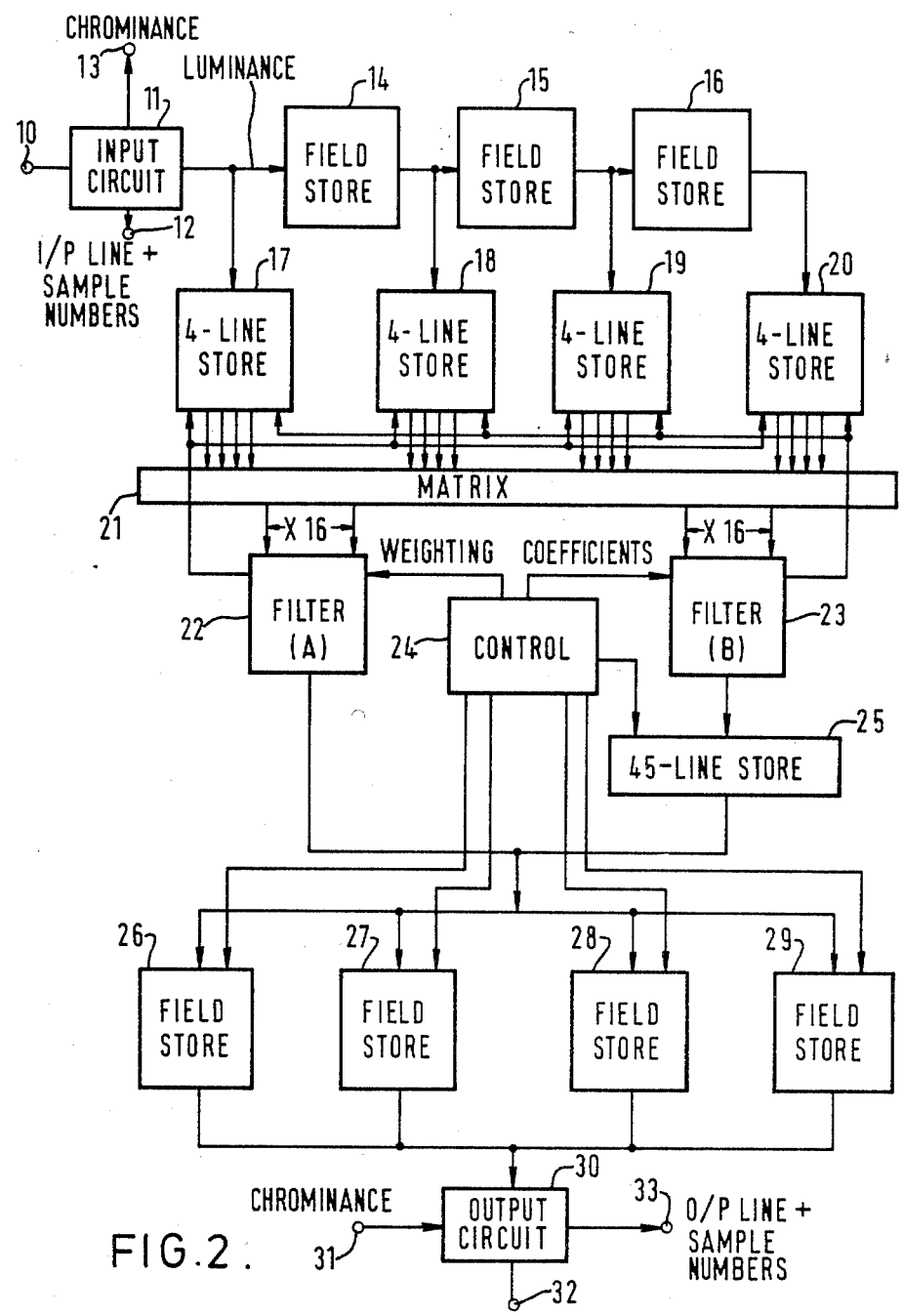
FIG. 2 shows in block diagrammatic form a main part of an embodiment of standards converter according to the invention.

The embodiment of standards converter will now be described with reference first to FIG. 2. The part of the standards converter shown in FIG. 2 is duplicated for the luminance and the chrominance samples of the digital television signal, and the part shown will be assumed to be that dealing with the luminance samples. The input digital television signal is supplied by way of an input 10 to an input circuit 11 which derives the input line and sample numbers for supply to an output 12 and the chrominance samples for supply to an output 13. The luminance components are supplied to series-connected input field stores 14, 15 and 16.

Figure 2A:
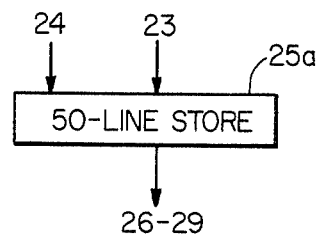
FIG. 2A shows a modification of a portion of FIG. 2.

Connected so as also to receive the inputs to the field stores 14, 15 and 16 respectively, are 4-line stores 17, 18 and 19 respectively, and connected to receive the output from the field store 16 is a 4-line store 20. Each of the 4-line stores 17 to 20 supplies four outputs to a matrix circuit 21 which supplies sixteen outputs to an interpolation filter 22 and sixteen outputs to an interpolation filter 23. Each of the filters 22 and 23 supplies array selection controls to each of the 4-line stores 17 to 20. Associated with the filters 22 and 23 are a control 24, and a 45-line store 25 which is connected to the output of the filter 23 and to the control 24. Alternatively the store 25 may be a 50-line store (FIG. 2A), but a 45-line store is in fact sufficient for the difference in the number of active lines in a 625-line system signal and a 525-line system signal.

The outputs of the filter 22 and of the 45-line store 25 are each connected to each of four parallel-connected output field stores 26 to 29, to which control signals are also supplied by the control 24.

The outputs of the field stores 26 to 29 are connected in common to an output circuit 30 and supply to the output circuit 30 the interpolated luminance samples at the correct output frequency. Also supplied to the output circuit 30 by way of an input 31 are the interpolated chrominance samples. The output circuit 30 supplies the output television signal to an output 32, and output line and sample numbers to an output 33.

The two filters 22 and 23 are required because at times the same array of sixteen input lines are required to produce more than one interpolated output line; although using different sets of weighting coefficients. The filters 22 and 23 may thus be designated the A array filter and the B array filter, respectively.

When the number of lines per field is being increased, for example, when converting a 525-line 60-field input signal to a 625-line 50-field signal, the additional lines are generated using the filter 23 and are stored in the 45-line store 25 until the next field write sequence. When converting in the opposite direction, the 45-line store 25 is by-passed.

Figure 3:
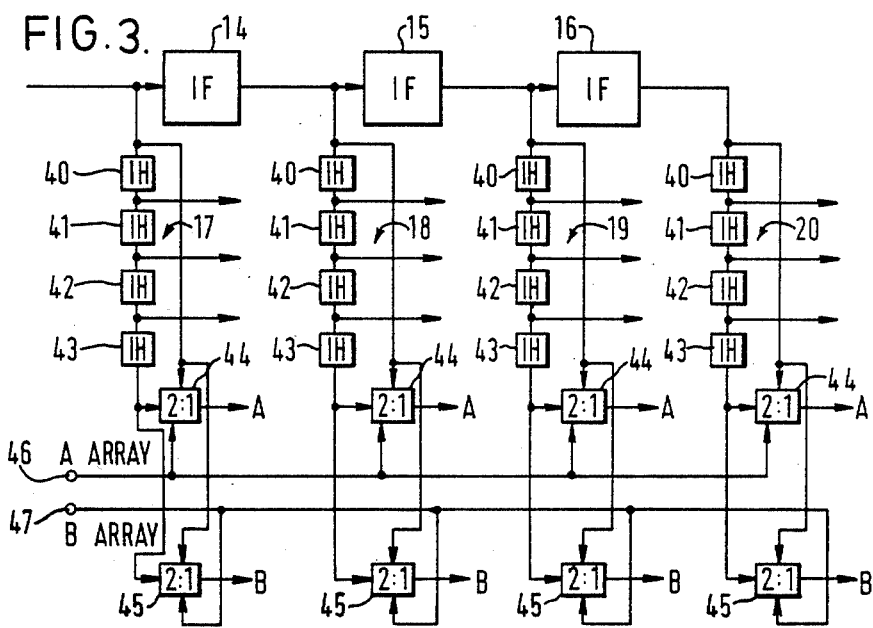
FIG. 3 shows in more detailed block diagrammatic form part of the standard converter of FIG. 2.

The operation will now be described in more detail with reference first to FIGS. 2 and 3. The field stores 14 to 16, the 4-line stores 17 to 20 and the filters 22 and 23 together form a two-dimensional digital filter. As shown in FIG. 3, each of the 4-line stores 17 to 20 comprises four 1-line delays 40 to 43 and two 2:1 selectors 44 and 45. The selectors 44 are controlled by an A array control signal supplied to an input 46, and the selectors 45 are controlled by a B array control signal supplied to an input 47.

In each of the 4-line stores 17 to 20, five successive lines of a respective input field are available, and in respect of the 4-lines stores 17 to 20 these lines belong to four successive input fields respectively. In each of the 4-line stores 17 to 20 the first and fifth of these lines are supplied to respective inputs of both of the selectors 44 and 45. Thus from the total of twenty input lines available, the sixteen input lines of the array A (FIG. 1) are selected when the A array control signal is supplied to the selectors 44, and the sixteen input lines of the array B (FIG. 1) are selected when the B array control signal is supplied to the selectors 45.

Figure 4:
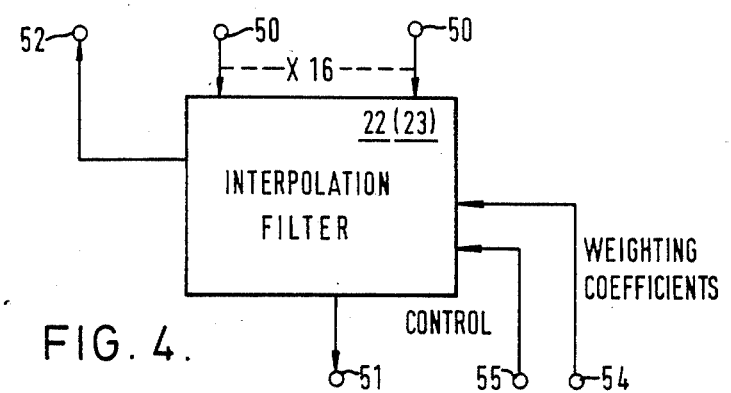
FIG. 4 shows in more detailed block diagrammatic form another part of the standards converter of FIG. 2.

Referring now to FIGS. 2 and 4, each of the filters 22 and 23 in which the actual interpolation is effected has sixteen inputs 50 to which the matrix circuit 21 supplies 8-bit data words representing successive luminance samples along respective lines of the arrays of sixteen input lines of the input television signal. 8-bit data words representing successive interpolated luminance samples along a single line of the output television signal are then supplied to an output 51. Operation within the filter 22 (23) is with 12-bit words to maintain interpolation accuracy. To receive the arrays it requires, the filter 22 (23) supplies the A (B) array control signal by way of a terminal 52 to the input 46 (47) (FIG. 3).

The weighting coefficients are loaded in sets of sixteen into multiplier positions in the filter 22 (23) by way of an input 54. This loading is done at the beginning of each line and the same weighting coefficients are used throughout a line. At the same time a signal supplied over a coefficient control line to an input 55 loads the weighting coefficients to the respective positions and causes the array control signal to be supplied.

Figure 5:
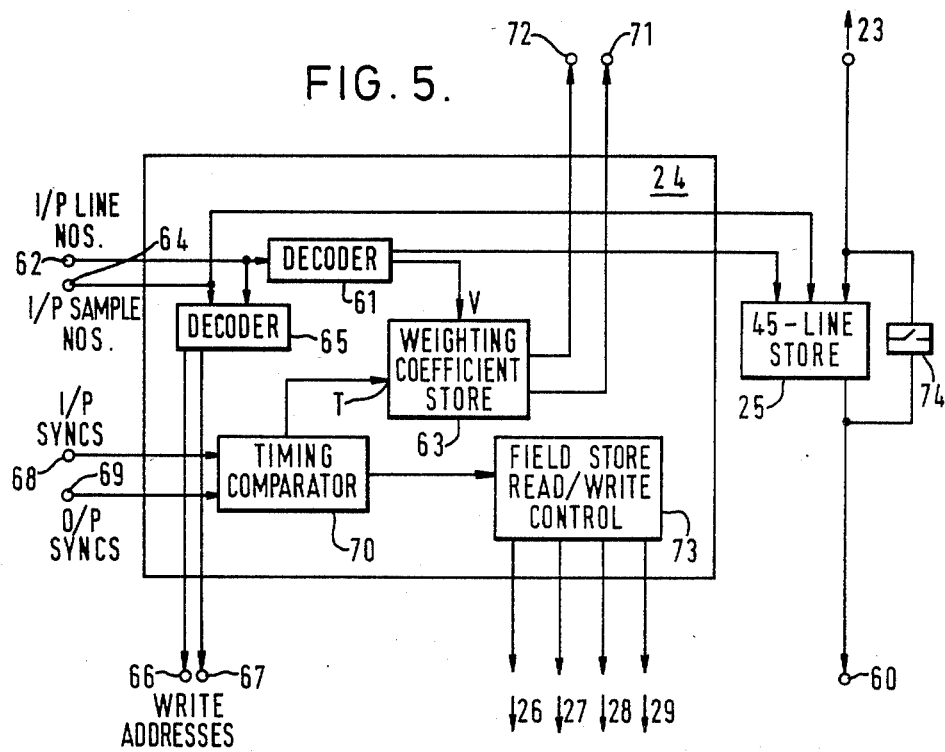
FIG. 5 shows in more detailed block diagrammatic form yet another part of the standards converter of FIG. 2.

Referring now to FIGS. 2 and 5, the 45-line store 25 takes the output data from the filter 23 and supplies it by way of an output 60 to the field stores 26 to 29. The control 24 comprises a decoder 61 to which the input line numbers are supplied by way of an input 62 and which supplies control signals and addresses to the 45-line store 25. The decoder 61 also derives signals representing the vertical position of the output line (FIG. 1) and supplies these signals to address a weighting coefficient store 63. The input sample numbers are supplied by way of an input 64 to the 45-line store 25 and to a decoder 65 which also receives the input line numbers and derives write addresses for supply by way of outputs 66 and 67 to the field stores 26 to 29.

Input and output field synchronizing signals are supplied by way of inputs 68 and 69 to a timing comparator 70 which derives signals representing the temporal position of the output line (FIG. 1), that is it determines the relative positions of the input and output fields, and supplies these signals to address the weighting coefficient store 63. Once per input line the weighting coefficient store 63 supplies the required set of sixteen weighting coefficients by way of an output 71 to the filters 22 and 23, or at least to the filter 22 or 23 in cases where only one will be operative in that line, and also the signal for the coefficient control line to an output 72.

The comparator 70 also supplies control signals to a field store read/write control 73 which supplies the required read/write control signals to the field stores 26 to 29.

The 45-line store 25 is used in converting from a 525-line input television signal to a 625-line output television signal, and in converting in the opposite direction it is by-passed by a by-pass element 74.

FIGS. 6 and 7 show the writing and reading sequences for the field stores 26 to 29 for the case of conversion from a 525-line 60-field per second television signal to a 625-line 50-field per second television signal and vice versa respectively.

Referring to FIG. 6, in the first field write sequence, which is shown at the top left, the writing into the field store 28 is from the filter 22, while at the same time data from the filter 23 is being written into the 45-line store 25. In the second field write sequence, the writing into the field store 28 is from the 45-line store 25 and then the writing into the field store 29 is from the filter 22. The writing continues in this general way, although as indicated, in two field write sequences out of every six it is only necessary to write from the 45-line store 25 and from the filter 22 respectively.

Referring to FIG. 7, in the first field write sequence, which is shown at the top left, the writing into the field store 26 is from the filter 22. The writing continues in this general way, although as indicated, in one field write sequence in every five it is necessary to write into two of the field stores 26 to 29, the second one being written into from the filter 23 with the 45-line store by-passed.

Although not shown or described, the complete television standards converter will normally also comprise an analog-to-digital converter at the input and a digital-to-analog converter at the output, so that the complete television standards converter will accept and supply ordinary analog television signals.

Because of the separation of the input field stores 14 to 16 from the output field stores 26 to 29, with consequent substantial simplification in the read/write operations of the field stores as compared with earlier standards converters, the field stores 14 to 16 and 26 to 29 can all be formed using 64k RAMs. As compared with earlier standards converters using 4k RAMs, therefore, there is a substantial reduction in complexity and in the total amount of hardware, despite the need to provide seven field stores compared with four field stores in at least one earlier standards converter.

It will be understood that the embodiment described can readily be modified for use with television signals of other standards.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A television standards converter comprising:
   an input store for receiving an input digital television signal of one standard and deriving therefrom arrays of sixteen lines, each array consisting of four successive lines from each of four successive fields of said input television signal;
   a weighting coefficient store for storing sets of sixteen weighting coefficients, respective said sets corresponding to positions both spatial and temporal of respective lines of an output digital television signal relative to said sixteen lines of said input television signal;
   two interpolation filters each for deriving line-by-line said output television signal by multiplying corresponding sample values from each of said sixteen lines of said input television signal by a respective weighting coefficient in a said set of weighting coefficients and summing the resulting products to form an interpolated sample value;
   an output store for receiving and storing said derived lines of said output television signal and from which said output television signal is read; and
   a multi-line store connected between the output of one of said interpolation filters and said output store and used to store the additional lines derived when said output television signal has more lines per field than said input television signal.

2. A television standards converter according to claim 1 wherein said input store comprises three series-connected field stores, and four 4-line stores connected respectively to the inputs of said three field stores and to the output of the last of said three field stores.

3. A television standards converter according to claim 2 wherein said output store comprises four further parallel-connected field stores.

4. A television standards converter according to claim 1 wherein said multi-line stores is a 45-line store.

5. A television standards converter according to claim 1 further comprising an analog-to-digital converter for receiving an input analog television signal and supplying said input digital television signal, and a digital-to-analog converter for receiving said output digital television signal and supplying an output analog television signal.

6. A television standards converter according to claim 1 wherein said multi-line store is a 50-line store.

* * * * *